United States Patent [19]

Trummer et al.

[11] Patent Number: 4,945,360
[45] Date of Patent: Jul. 31, 1990

[54] RADAR ALTIMETER

[75] Inventors: Guenther Trummer, Baiersdorf; Richard Koerber, Putzbrunn; Ludwig Mehltretter, Riemerling, all of Fed. Rep. of Germany

[73] Assignee: Messerschmitt-Boelkow-Blohm GmbH, Munich, Fed. Rep. of Germany

[21] Appl. No.: 406,295

[22] Filed: Sep. 12, 1989

[30] Foreign Application Priority Data

Sep. 12, 1988 [DE] Fed. Rep. of Germany ....... 3830992

[51] Int. Cl.$^5$ ............................................. G01S 13/26
[52] U.S. Cl. ................................... 342/122; 342/128; 342/200; 342/165; 342/85
[58] Field of Search ................. 342/122, 200, 19, 128, 342/100, 82, 83, 84, 85, 165

[56] References Cited

U.S. PATENT DOCUMENTS

| | | | |
|---|---|---|---|
| 4,282,524 | 8/1981 | Eymann et al. | 342/122 |
| 4,291,309 | 9/1981 | Spiller et al. | 342/82 |
| 4,367,473 | 1/1983 | Marin et al. | 342/87 |
| 4,427,981 | 1/1984 | Kyriakos | 342/122 |
| 4,435,708 | 3/1984 | Kyriakos | 342/122 |
| 4,468,638 | 8/1984 | Kyriakos | 331/178 |
| 4,503,401 | 3/1985 | Kyriakos et al. | 331/4 |
| 4,593,287 | 6/1986 | Nitardy | 328/162 |
| 4,620,192 | 10/1986 | Collins | 342/128 |
| 4,806,935 | 2/1989 | Fosket et al. | 342/120 |

OTHER PUBLICATIONS

Article by H. Mattes, "Funksysteme fuer Ortung und Navigation", v. Kramer, Elektrische Hoehenmesser, (Radio Systems for Location Finding and Navigation), published by Verlag Berliner Union GmbH, Stuttgart, Federal Republic of Germany.
"Principles of Modern Radar", GTRI, 1984, pp. 19-15, 19-17 to 19-22.

Primary Examiner—Thomas H. Tarcza
Assistant Examiner—John B. Sotomayor
Attorney, Agent, or Firm—W. G. Fasse; D. H. Kane, Jr.

[57] ABSTRACT

The present radar altimeter operates in accordance with the frequency modulated continuous wave principle in the C-band. The altimeter is constructed with microminiaturized integrated circuits and provides a completely digital signal evaluation and mode control which enables the transmitter to produce a wave-form providing the altimeter with the following advantages. A silent mode during the signal evaluation greatly improves the resistance of the altimeter against electronic countermeasures. The transmitter frequency is stabilized and a compensation for Doppler frequency drift is provided. Further, the altimeter is able to discriminate between intended proper targets on the one hand and false or erroneous targets on the other hand. The altimeter is equipped with a self-testing unit which provides different functions in different modes.

11 Claims, 3 Drawing Sheets

RADAR ALTIMETER

FIELD OF THE INVENTION

The invention relates to a radar altimeter operating in the C-ban with frequency modulated continuous waves (FMCW-principle).

BACKGROUND INFORMATION

Radar altimeters of the above type have been described, for example, in "Radio Systems For Location Finding and Navigation" by Kramar, published by: Verlag Berliner Union GmbH, Stuttgart, Federal Republic of Germany. Such systems are, for example, produced and marketed by: AEG (Federal Republic of Germany), Honeywell (U.S.A) and others. The several different versions of such altimeters, however, are subject to a number of disadvantages, especially with regard to their dimensions, their high power consumption, and their high weight due to the analog signal processing. Another disadvantage resides in the fact that particularly the analog signal processing in a continuous operation can be easily discovered, even at long distance where the modulation frequency is controlled in response to the measured altitude. Such signal processing is discovered not only as to its existance, but also the measured altitude can be discovered. Furthermore, many systems of the known type have a rather limited electronic countermeasure resistance and additionally provide faulty altitude measurements when used in forested areas since the analog signal processing even tracks the treetops.

OBJECTS OF THE INVENTION

In view of the foregoing it is the aim of the invention to achieve the following objects singly or in combination:

to provide a radar altimeter of the type mentioned above which avoids the drawbacks and disadvantages of the prior art in that it is smaller in size, lower in weight, and has a substantial resistance against detection by electronic countermeasures;

to provide a radar altimeter which can discriminate between intended target and erroneous targets such as treetops;

to construct a radar altimeter in such a way that it has a self-protection feature against destruction by electronic countermeasures; and which includes features for a silent mode during signal processing, for stabilizing the transmitter frequency, and for compensating any Doppler errors.

SUMMARY OF THE INVENTION

The present radar altimeter works in the C-band in accordance with the so-called frequency modulated continuous wave principle (FMCW). According to the invention the altimeter is characterized by microminiaturized integrated circuits (MMIC) with a complete digital signal evaluation and mode control. A voltage controlled oscillator (VCO) is connected through a divider circuit to a microprocessor or computer which modulates the transmitter frequency of the VCO in a saw-tooth manner. The divider circuit measures the actual frequency in a scaled down way to deliver a frequency dependent signal to a counter in the microprocessor for producing a frequency control signal for the voltage controlled oscillator. This frequency control signal is applied to the frequency ramp of the VCO.

The output signal of the VCO passes through a signal attenuating circuit, through a power amplifier, and through a selftesting unit to a transmitter antenna. The self-testing unit includes two switches also constructed as microminiaturized integrated circuit components. The self-testing unit further includes a signal damping circuit, a detector diode, and a signal coupling member for applying a portion of the received radio frequency power to the detector diode which in turn provides a d.c. voltage to a comparator for comparing the measured d.c. voltage with a threshold voltage. The comparator provides an output signal if the measured d.c. voltage representing the portion of the received radio frequency power exceeds the threshold voltage. This output signal is supplied to the microprocessor for interrupting any further transmission to perform a so-called waiting loop. One of the two switches of the self-testing unit is preferably connected in the transmitter antenna path while the other switch is preferably connected in the receiver antenna path.

The combination of the above features assures a silent mode during the signal processing, thereby substantially reducing the danger of detection by electronic countermeasures. These features also stabilize the transmitter frequency and assure an effective Doppler error compensation. The system is capable to distinguish or discriminate between proper targets and erroneous targets. The selftesting unit of the system makes sure that excessive signals received, for example electronic countermeasure signals, cannot destroy the present radar altimeter.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
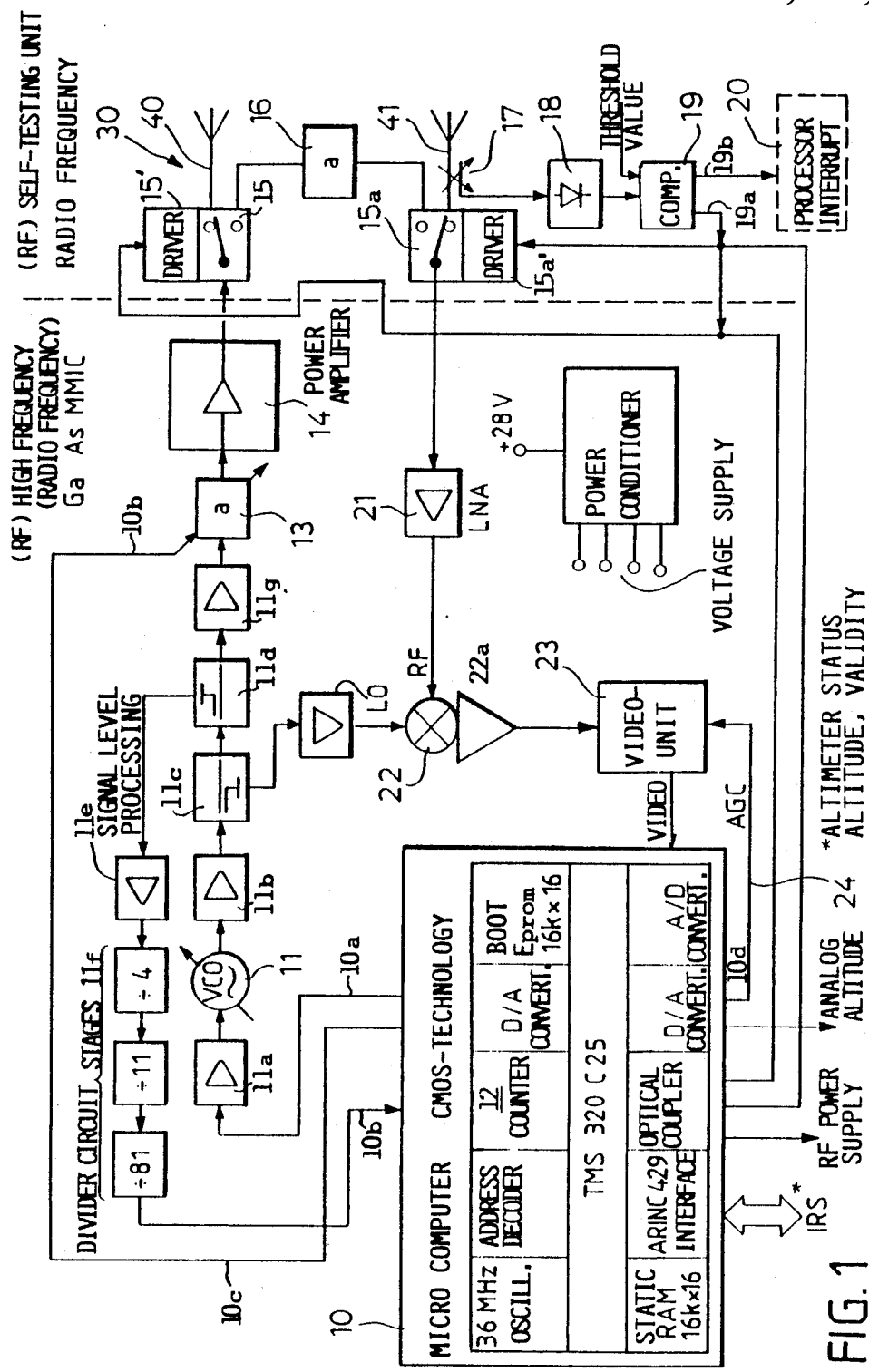
FIG. 1 is a circuit diagram of the radar altimeter according to the invention illustrating the essential structural groups of components in a schematic presentation.
Figure 3:
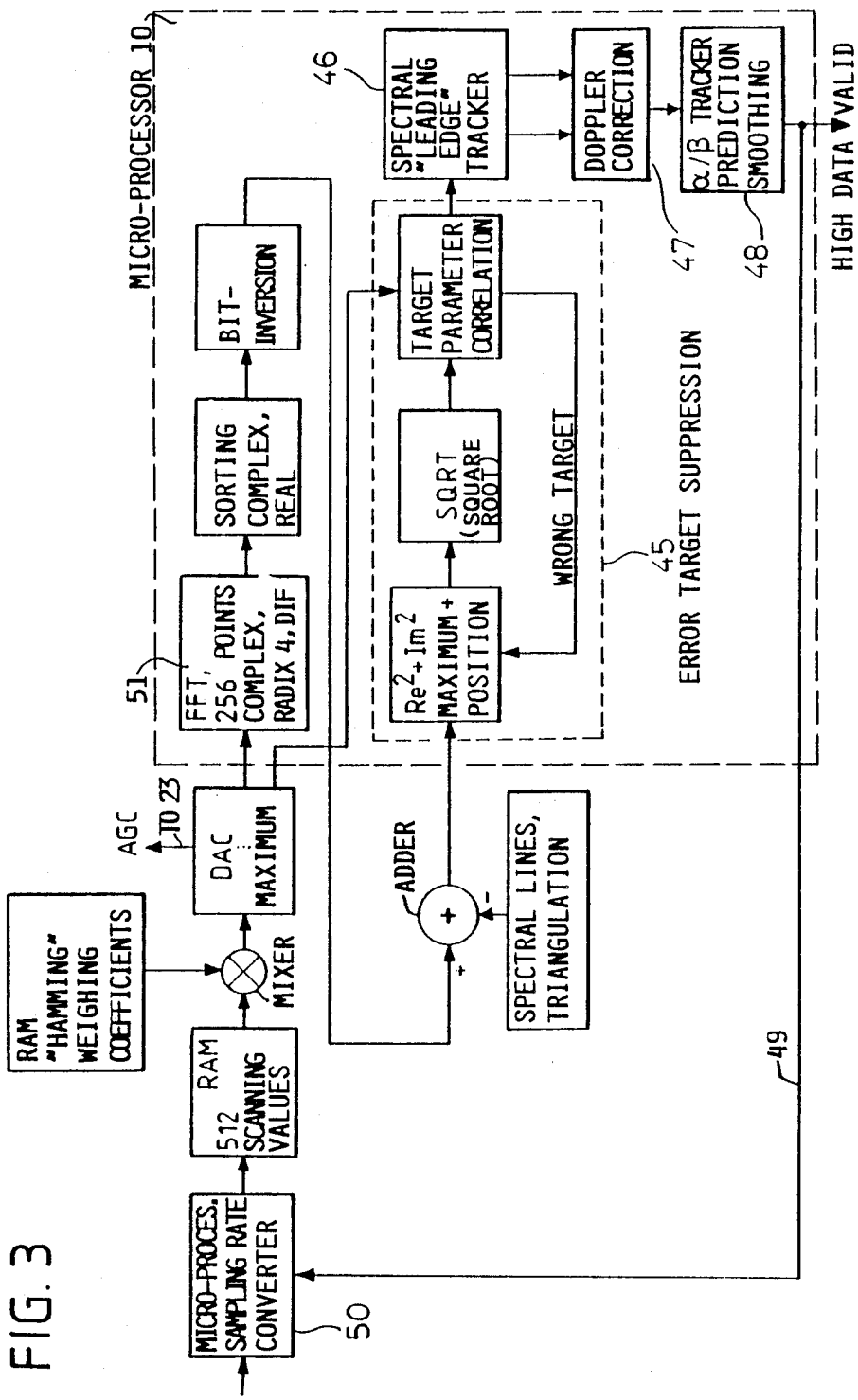
FIG. 3 is a block circuit diagram of the circuit components in the microprocessor for calculating the altitude.

FIG. 1 shows a block circuit diagram of the construction of a radar altimeter according to the invention, whereby gallium-arsenic-microminiaturization integrated circuits are used, permitting an above average degree of integration. Further, by using CMOS technology in the construction of the present altimeter circuits, it becomes possible to employ exclusively a digital signal processing A voltage controlled oscillator VCO 11 is controlled in its frequency by the microcomputer 10 having a control output 10a connected to an input amplifier stage 11a of the VCO 11. The computer output 10a provides a saw-tooth type control voltage for the frequency control of the VCO 11 which may have a wave-form as shown in FIG. 3. The modulation of the VCO 11 frequency takes place in accordance with the FMCW-principle. The output of the VCO 11 is amplified at 11b and supplied to two decoupling stages 11c and 11d. The decoupling stage 11c provides a frequency control signal to a local oscillator LO, the output of which is supplied to a frequency mixing stage 22 to be described in more detail below. The decoupling stage 11d provides a frequency signal to a signal level processing circuit 11e, such as a threshold level amplifier, the output of which is connected to a divider circuit 11f having several stages. The output of the last stage of the divider circuit 11f is connected to a control input 10b of the microprocessor 10. The first stage of the divider circuit 11f divides by four, the second by eleven, the third by eighty-one. Thus, the actually measured transmitter frequency is scaled down to about 1 MHz and the scaled down frequency signal is received by a counter 12 in the microcomputer 10. The output of the counter 12 is compared with tabled frequency values stored in a memory of the microcomputer. The found table value corresponds directly to the starting address of the frequency ramp or input circuit 11a of the VCO 11. Since the lower and the upper transmitter frequency of the VCO ramp are counted out alternatively, it is now possible to control the sweep frequency of the VCO 11 in a closed loop manner. Thus, the effort and expense for linearizing and stabilizing the VCO 11 is small. As a result, the invention avoids the heretofore required and expensive, as well as trouble-prone phase locked circuits. The invention also avoids the conventional down converter units which required inputs of harmonic wave-forms. The just described closed loop control circuit including the divider circuit 11f 10 according to the invention additionally has the advantage that it is self-adjusting. The table of frequencies is established automatically by the microcomputer in a calibrating cycle in which the measured frequency is divided by the respective voltage value of the control ramp of the voltage controlled oscillator 11. As a result, the circuit according to the invention eliminates any aging effects that may occur when the system is stored for prolonged periods of time, including years of storage.

The output of the coupling circuit 11d is also applied to an output amplifier 11g of the VCO circuit 11. The output of the amplifier 11g in turn is applied through an adjustable signal attenuating circuit 13 to a power amplifier 14 which feeds into a transmitter antenna 40 through a "MMIC" switch 15 controlled by its driver circuit 15'. The signal attenuation circuit 13 has a control input connected to a control output 10c of the microcomputer or processor 10. The attenuating circuit 10 is variable so that the microcomputer 10 can adjust the power level to correspond to the ascertained altitude.

The switch 15 forms part of a radio frequency self-testing unit 30 which further comprises another MMIC switch 15a with its driver circuit 15a' and a signal damping circuit 16 interconnecting the normally open contacts of the two switches 15 and 15a. The normally closed contact of the switch 15 is connected to the transmitter antenna path 40. The normally closed contact of the switch 15a is connected to the receiver antenna path 41 which is cooperating with a decoupling member 17 feeding into a rectifying circuit 18 feeding in turn into one input of a comparing circuit 19 having another input connected to a threshold value. The just mentioned components also form part of the self-testing unit 30. The switches 15 and 15a have a short switching time typically of about 2 ns. The damping circuit 16 provides a constant signal damping, one output of the comparator 19 is connected to a processor interrupt circuit 20 forming part of the microprocessor or computer 10. Another output of the comparator 19 is connected to the driver circuits 15' and 15a' as will be described in more detail below.

The self-testing unit 30 performs different functions during different modes of operation, as will now be described.

During the self-testing mode, the VCO 11 generates a fixed frequency. During this time, the switch 15 is switched at a high frequency so that this switching frequency is heterodyned onto the fixed frequency generated by the VCO 11. Thus, this switching frequency appears in the digital evaluating unit of the microcomputer 10 as a simulated altitude. As a result, it is now possible to simulate all practically occurring distances or altitudes by varying the switching frequency of the switch 15.

Varying the switching frequency is possible in two ways. In one instance transcoupling between the transmitter antenna 40 and the receiver antenna 41 is employed. In the other instance, the damping circuit 16 of the self-testing unit 30 is employed. In the first instance the normally closed contact of the switch 15 is connected to the transmitter antenna 40. In the second instance, the switch 15 is connected with its normally open contact to the damping circuit 16.

The first instance is important because it enables service work or maintenance work to be done at the airport. Such service work includes the altimeter as well as the antennas. The second instance is important in connection with military equipment, for example, used in connection with carrier flights for dispenser systems, because the self-test takes place without any radiation or transmission of radio frequency so that a detection of the altimeter by foreign sensors is not possible during service work.

Figure 2:
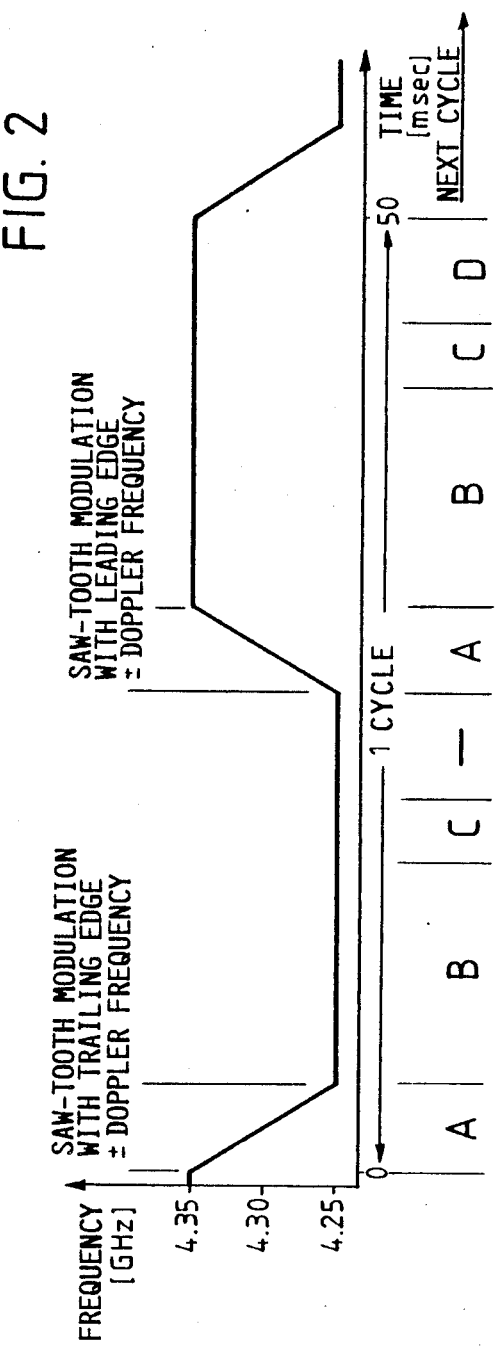
FIG. 2 is a frequency time diagram illustrating a waveform suitable for use in the present radar altimeter in its operational mode.

During the operational mode the wave-form shown in FIG. 2 is being transmitted. In that instance the switch 15 is in its shown normally closed contact position connecting the power amplifier 14 to the transmitter antenna 40 for a relatively short measuring phase of about 1 ms. During the evaluation phase, which lasts, for example for about 18 ms, of the measuring signals the self-testing unit 30 switches the switch 15 to its normally open contact and thus to the damping circuit 16, whereby almost no radio frequency is radiated out of the system due to the fact that the circuit 16 has an attenuation of about −16 dBm. As a result, the present radar altimeter is hard to detect.

The radar altimeter according to the invention is also capable of performing a so-called ECCM mode (electronic counter-counter mode). During the performance of the ECCM mode the present altimeter receives through the above mentioned decoupling member 17, preferably arranged in the receiver antenna path 41, a portion of the received radio frequency power which is applied to the rectifying circuit 18 in the form of a detector diode which in turn supplies a d.c. voltage to the comparator 19 for comparing with a threshold voltage. This threshold voltage is so selected that the altimeter will be protected against destruction by electronic countermeasures. Stated differently, the comparator must assure that a received input power which exceeds a permissible input power by a fixed percentage, cannot cause the destruction of the receiver of the altimeter.

If the present altimeter is exposed to a high radio frequency input by a so-called "jammer" in which case the threshold value of the comparator 19 is exceeded, the present circuitry makes sure that the altimeter is automatically switched into the stand-by mode or into the self-testing mode without modulating the switch 15 in the receiver section. As a result, the switches 15 and 15a become reflective to protect the altimeter against destruction. For this purpose one output 19a of the comparator 19 is connected to the drivers 15' and 15a' of the respective switches 15 and 15a. Another output 19b of the comparator 19 which is connected to the digital process or processor or interrupt circuit 20, causes an interruption of the processing during which the processor 10 performs a so-called waiting or holding loop. During this waiting or holding loop the so-called "FLAG-status" is continuously interrogated. If the interrogation shows that the high frequency power at the antenna 41 as received from a jammer is again below the threshold value, the respective "flag" is set and the digital processor 20 switches the altimeter back to its operational mode.

Referring further to FIG. 1, the receiver input switch 15a is connected to an input of a so-called low noise amplifier (LNA) 21 which is connected with its radio frequency output to another input of the frequency mixing stage 22. The stage 22 provides an intermediate frequency at its output which is in the video range and supplied through an amplifier 22a to the video unit 23. This homodyne reception provides the video unit 23 with a video signal that is subjected to a level processing in response to an automatic gain control 24 received from an output 10d of the microprocessor 10. Additionally, the video signal is passed through a low-pass filter (antialiaising). Thereafter the video signal is scanned or sampled in its frequency in accordance with the so-called Nyquist criterium. At least the scanning or sampling takes place with a factor of 2.5.

The circuit arrangement in the form of a modular unit, for determining the altitude is shown in FIG. 3.

As mentioned, the sampling frequency or rate is controlled by the micro-processor 10 which also adjusts the frequency swing and the modulation frequency of the altimeter by using the table of the saw-tooth generator. Thus, it now becomes possible to define an altitude window, so to speak, which has a decreasing accuracy. However, according to another embodiment of the invention, it is possible to define an altitude window having a constant accuracy by means of a sampling rate converter 50 shown in FIG. 3. In the first instance wherein the altitude window has a decreasing accuracy, the frequency swing is decreasing in accordance with the following formula according to which the intermediate frequency is equal to two times the altitude times the modulation frequency times the frequency swing divided by the speed of light.

During the timing signal the maximum is determined and the AGC control signal 24 is respectively adjusted for the next following measuring interval. The spectrum is then calculated through a fast Fourier transformation in the block 51 shown in FIG. 3. Spectral superpositions that may occur due to an insufficient isolation by the mixing stage 22, between the local oscillator input LO and the radio frequency input RF and due to the finite decoupling between the transmitter antenna 40 and the receiver antenna 41, are deducted from the measured spectrum. For this purpose, a preliminary calibrating cycle is performed and the calibrating values are stored in the memory of the micro-computer 10. Thereafter, spectral manipulations are performed for suppressing an error target. Error targets in this context are, for example, treetops in forested areas or ammunition fired by an aircraft, or dispensers or other flying bodies and so forth. The altitude or distance to error targets is suppressed by the evaluation of the spectral characteristics of these targets. Such spectral characteristics or signatures of error targets are spectral lines having a high amplitude and a small band width compared to the spectral characteristics of actual targets the altitude or distance of which is to be measured. Spectral characteristics of actual or desired targets are characterized by a rapid amplitude rise with a following slow decline over a larger band width.

Following the just described suppression of an error target in the block 45 shown in FIG. 3, the shortest distance is determined by differentiating the spectrum and supplying the respective signal to a spectral leading edge tracker 46. At this time, the measured frequency and thus directly the distance or altitude is still subject to the Doppler frequency drift. However, by controlling the VCO 11 in accordance with the characteristic curve shown in FIG. 2, it is possible to compensate for the Doppler frequency shift without any additional hardware effort and expense. This can be accomplished merely by averaging over a rising and falling flank of the saw-tooth curve ± the Doppler frequency. This function or rather Doppler correction, is performed by the block 47. Several altitude values are then averaged by a so-called $\alpha/\beta$ tracker as is, for example, known from "Principles of Modern Radar", GTRI, 1984. The $\alpha/\beta$ tracker is part of the block 48 which also performs a prediction function and a smoothing function. The prediction function makes sure that in case of a ground reflection which is too weak, the last measured altitude is not abruptly shut out so that undesired maneuvers are avoided. The calculated altitude appearing at the output of the block 48 may be optionally supplied through a conductor 49 to an input of the sampling rate converter 50 for controlling this converter 50 in a closed loop manner.

Referring to FIG. 2, the wave-form shown there has several advantages. One important advantage is the fact that the Doppler frequency can be determined without any extra hardware requirements.

Further, a spectral falsification of the measured result is avoided. Such falsification is unavoidable in the prior art due to the resetting of the oscillator as is the case in a continuous saw-tooth type modulation in combination with an analog signal processing. Another advantage is seen in the fact that the detectability of the present altimeter by electronic countermeasures, is substantially more difficult than in prior art systems due to the switching of the present system into the stand-by mode during the signal evaluation phase when a selftesting takes place without any modulation of the switch 15a of the receiver. Additionally, the duration of the evaluation phase can be adjusted by means of a pseudo code, whereby detection is prevented or at least made more difficult. The just mentioned pseudo code permits adjusting the time duration of a waiting cycle or stand-by mode, whereby resistance to electronic countermeasures is improved.

Referring further to FIG. 2, the following functions are performed during the time periods A, B, C, and D marked along the abscissa in FIG. 2.

Time period A: read-out of the digital-to-analog converter (D for the saw-tooth modulation of the voltage controlled oscillator 11, input of the scanned or sampled values.

Time period B: calculating the distance and automatic gain control (AGC) amplification, measuring the transmitter frequency, switching the altimeter into the stand-by mode.

Time period C: input of the counter read-out and of the transmitter frequency, correction of the start address of the voltage controlled oscillator ramp, closed loop control of the amplification of the automatic gain control.

Time period D: $\alpha/\beta$ tracking, smoothing of the signal distance correction by correction of the Doppler drive, data transfer to the data bus.

With regard to the structural details, it should be mentioned that the antennas 40 and 41 are constructed as so-called "patch antennas" having a modular size of 170×80 m. The patch antenna is arranged in the E plane along the flight direction. The radio frequency portion (50×80 mm) is soldered to the back of the antenna and connected to the transmitter antenna 40 as well as to the receiver antenna 41 by SMA-connectors. The radio frequency portion is constructed partially by employing microstrip conductor techniques and thin film techniques on a ceramic substrate, and partially by employing so-called coplanar techniques. The entire digital portion with the power supply and the bus interface is mounted on a simple printed circuit board having a European standard size about 10×15 cm.

In connection with conventional analog altimeters, it is necessary to have an antenna decoupling larger than 75 dB for measuring altitudes up to 1500 m. This decoupling is provided by a physical spacing of about 0.5 m between the transmitter antenna and the receiver antenna. Contrary to these conventional requirements, according to the invention, the antenna decoupling is sufficient if it is about 50 dB because, due to the digital signal processing, one obtains a gain of about 30 dB. A physical separation between the two antennas is no longer necessary according to the invention.

The features of the invention may be transformed without any problems for use in the X-band or in the K-band. For this purpose an altitude harmonic of the voltage controlled oscillator 11 is filtered out for each band-pass filter and respectively amplified, whereby the above disclosed closed loop control through the divider circuit 11f is retained. The remaining required components such as switches and amplifiers are available in MMIC-techniques up to a frequency of 20 GHz.

Although the invention has been described with reference to specific example embodiments, it will be appreciated that it is intended to cover all modifications and equivalents within the scope of the appended claims.

What we claim is:

1. A radar altimeter operating, preferably in the C-Band, in accordance with the frequency modulated continuous wave (FMCW) principle, comprising receiver means for receiving reflected radar signals and transmitter means for transmitting radar signals, said transmitter means including voltage controlled oscillator means (11) for generating a carrier frequency, micro-computer means (10) for controlling the operation of said altimeter, closed loop control circuit means (11f, 10a, 10b) interconnecting said voltage controlled oscillator means (11) and said microcomputer means (10), a variable signal attenuating circuit (13) connected to an output of said voltage controlled oscillator, a power amplifier (14) connected to an output of said damping circuit (13), a self-testing mode control circuit (30) including a transmitter MMIC-switch (15) and a transmitter antenna means (40) connectable through said transmitter MMIC-switch (15) to an output of said power amplifier (14), said self-testing mode control circuit further including a receiver antenna (41) and a receiver MMIC-switch (15a) for connecting said receiver antenna to said receiver means, and decoupling means (17) operatively connected to said receiver antenna for decoupling a portion of received radio frequency power, detector means (18) connected to said decoupling means (17) for providing a d.c.-voltage signal representative of said received radio frequency power, signal comparing means connected to receive said d.c.-voltage signal for comparing said d.c.-voltage signal with a reference threshold signal, said microcomputer comprising interrupt circuit means (20) connected to an output of said signal comparing means for causing a processing interruption and a "waiting loop" in response to a signal at said output of said signal comparing means signifying an excessive received radio frequency power, and wherein all circuits of said altimeter are constructed in accordance with MMIC-techniques for a complete digital signal evaluation and mode control.

2. The radar altimeter of claim 1, wherein said self-testing mode control circuit further comprises a signal damping circuit (16) interconnecting said transmitter MMIC-switch (15) and said receiver MMIC-switch (15a).

3. The radar altimeter of claim 2, wherein said transmitter MMICswitch (15) and said receiver MMIC-switch (15a) each comprises a normally closed signal path and a normally open signal path, said normally closed signal path of said transmitter MMIC-switch (15) being connected to said transmitter antenna (40), said normally closed signal path of said receiver MMIC-switch being connected to said receiver antenna, said normally open signal paths of said switches (15, 15a) being interconnected by said signal damping circuit.

4. The radar altimeter of claim 1, wherein said signal attenuating circuit (13) is connected to a control output (10c) of said microcomputer (10) for attenuating the output signal of said voltage controlled oscillator means (11).

5. The radar altimeter of claim 1, wherein said closed loop control circuit means (11f) comprise a plurality of frequency scale-down divider stages arranged in series for supplying a scaled-down actual frequency representing signal to a counter (12) in said microcomputer or processor (10).

6. The radar altimeter of claim 1, wherein said receiver means comprise a low noise amplifier (21) for reducing the noise factor, a local oscillator (LO), and a signal mixing stage connected with one of its inputs to said local oscillator and with the other of its inputs to said low noise amplifier (21), a video unit, and means for supplying an output of said signal mixing stage to said video unit.

7. The radar altimeter according to claim 6, wherein said video unit comprises means for signal level processing, means for receiving an automatic gain control signal from said microcomputer or processor (10) for controlling the operation of said video unit, and low-pass filter means for filtering an output signal of said signal mixing stage.

8. The radar altimeter according to claim 7, wherein said voltage controlled oscillator is a saw-tooth generator, wherein said microcomputer for a digital signal processing is constructed by CMOS techniques, and wherein said microcomputer adjusts the frequency swing and the modulation frequency of the altimeter by means of a table of said saw-tooth generator.

9. The radar altimeter of claim 1, wherein said microcomputer comprises memory means having stored therein spectral values of a calibration cycle and spectral values of known error targets such as treetops, flying bodies, etc., said microcomputer further comprising means for suppressing received signals representing error targets.

10. The altimeter of claim 1, further comprising signal tracking means including means for differentiating a spectrum and determining a local maximum by way of a sliding window technique, and means for comparing with the standard deviation for determining the shortest distance or altitude.

11. The altimeter according to claim 1, further comprising means for eliminating a Doppler frequency drift by controlling said voltage controlled oscillator means with a determined saw-tooth characteristic (FIG. 2), whereby an altitude representing signal is calculate by averaging, said altimeter further comprising a sampling rate converter which is optionally controlled in a closed loop manner by said altitude representing signal.

* * * * *